US006329788B1

(12) United States Patent
Bailey, Jr. et al.

(10) Patent No.: US 6,329,788 B1
(45) Date of Patent: Dec. 11, 2001

(54) CORDLESS POWER TOOL SYSTEM

(75) Inventors: Rouse R. Bailey, Jr., New Park, PA (US); Paul S. White, Ellicott City, MD (US); Thomas J. Bodine, Jessup, MD (US); John E. Buck, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/579,940

(22) Filed: May 26, 2000

Related U.S. Application Data

(63) Continuation of application No. 09/133,923, filed on Aug. 13, 1998, which is a continuation-in-part of application No. 09/133,924, filed on Aug. 13, 1998, now Pat. No. 6,057,608.

(51) Int. Cl.[7] .................................................... H02J 7/00
(52) U.S. Cl. .............................................. 320/114; 307/43
(58) Field of Search ................................... 320/114, 107; 429/96, 97, 98, 99, 100; 307/43, 64

(56) References Cited

U.S. PATENT DOCUMENTS

| 2,962,062 | 11/1960 | Winkler et al. | .................. 30/377 |
| 3,262,472 | 7/1966 | McCarty et al. | .................. 30/376 |

(List continued on next page.)

FOREIGN PATENT DOCUMENTS

| 39 19 702 | 11/1991 | (DE) . |
| 44 03 189 | 11/1991 | (DE) . |
| G 91 15 492 | 4/1992 | (DE) . |
| 93 11 901 | 8/1993 | (DE) . |
| 93 19 361 | 12/1993 | (DE) . |
| 196 04 346 A1 | 8/1996 | (DE) . |
| 34 29 095 | 1/1997 | (DE) . |
| 295 13 330 | 2/1997 | (DE) . |
| 0 238 718 | 11/1986 | (EP) . |
| 0 374 600 B1 | 8/1995 | (EP) . |
| 2 302 051 | 1/1997 | (GB) . |
| 1-281880 | 11/1989 | (JP) . |

OTHER PUBLICATIONS

1997 DeWalt Catalog, p. 18 (No month).
Makita 1997 Pocket Catalogs, pp. 11, 16 (No month).
Milwaukee Heavy Duty Electric Tools For Contractors and Industry, 1997 Catalog, p. 24 (No month).
Makita 1993 Catalog, four pages including cover page, pp. 17 and 19, and back page (dated 1993) (No month).

* cited by examiner

Primary Examiner—Peter S. Wong
Assistant Examiner—Lawrence Luk
(74) Attorney, Agent, or Firm—Harness, Dickey & Pierce, P.L.C.

(57) ABSTRACT

A system of cordless power tools includes a cordless power tool adapted to removably receive a rechargeable battery pack. The system further includes a battery pack charger and a converter for converting AC electricity to DC electricity. A battery pack interface block is captured between clam shell halves of a battery pack housing and includes a plurality of male blade terminals. The male blade terminals are received within recessed female terminals of a tool terminal block and similarly received by recessed female terminals of the charger. The tool terminal block further includes a pair of male terminals which engage recessed female terminals of the converter. Apertures are provided in guide rails of the battery pack to receive the male terminals of the tool terminal block.

31 Claims, 10 Drawing Sheets

U.S. PATENT DOCUMENTS

| | | | |
|---|---|---|---|
| 3,292,673 | 12/1966 | Gregory | 30/377 |
| 3,447,577 | 6/1969 | Burrows et al. | 30/377 |
| 3,706,332 | 12/1972 | George | 30/391 |
| 3,730,239 | 5/1973 | Kaman et al. | 30/391 |
| 3,757,194 | 9/1973 | Weber et al. | 320/112 |
| 3,883,789 | 5/1975 | Achenbach et al. | 429/9 |
| 3,952,239 | 4/1976 | Owings et al. | 320/113 |
| 3,973,179 | 8/1976 | Weber et al. | 320/113 |
| 4,221,051 | 9/1980 | Glass | 30/377 |
| 4,353,165 | 10/1982 | Albery | 30/376 |
| 4,516,324 | 5/1985 | Heininger, Jr. et al. | 30/377 |
| 4,555,849 | 12/1985 | Ando et al. | 30/388 |
| 4,616,169 | 10/1986 | Proffitt | 320/111 |
| 4,847,513 | 7/1989 | Katz et al. | 307/149 |
| 4,856,394 | 8/1989 | Clowers | 83/56 |
| 4,982,501 | 1/1991 | Sauerwein et al. | 30/376 |
| 5,010,651 | 4/1991 | Techter et al. | 303/76 |
| 5,140,249 | 8/1992 | Linder et al. | 320/114 |
| 5,280,525 | 1/1994 | Lopic et al. | 320/2 |
| 5,354,215 * | 10/1994 | Viracola | 320/114 |
| 5,381,602 | 1/1995 | Matzo et al. | 30/377 |
| 5,454,167 | 10/1995 | Albery | 30/377 |
| 5,504,412 | 4/1996 | Chan et al. | 320/115 |
| 5,508,123 | 4/1996 | Fan | 429/96 |
| 5,517,763 | 5/1996 | Schilling et al. | 30/376 |
| 5,553,675 | 9/1996 | Pitzen et al. | 173/217 |
| 5,589,288 | 12/1996 | Coulson et al. | 429/96 |
| 5,671,815 | 9/1997 | Kabatnik et al. | 173/217 |
| 5,792,573 | 8/1998 | Pitzen et al. | 429/97 |
| 6,057,608 * | 5/2000 | Bailey, Jr. et al. | 320/112 |

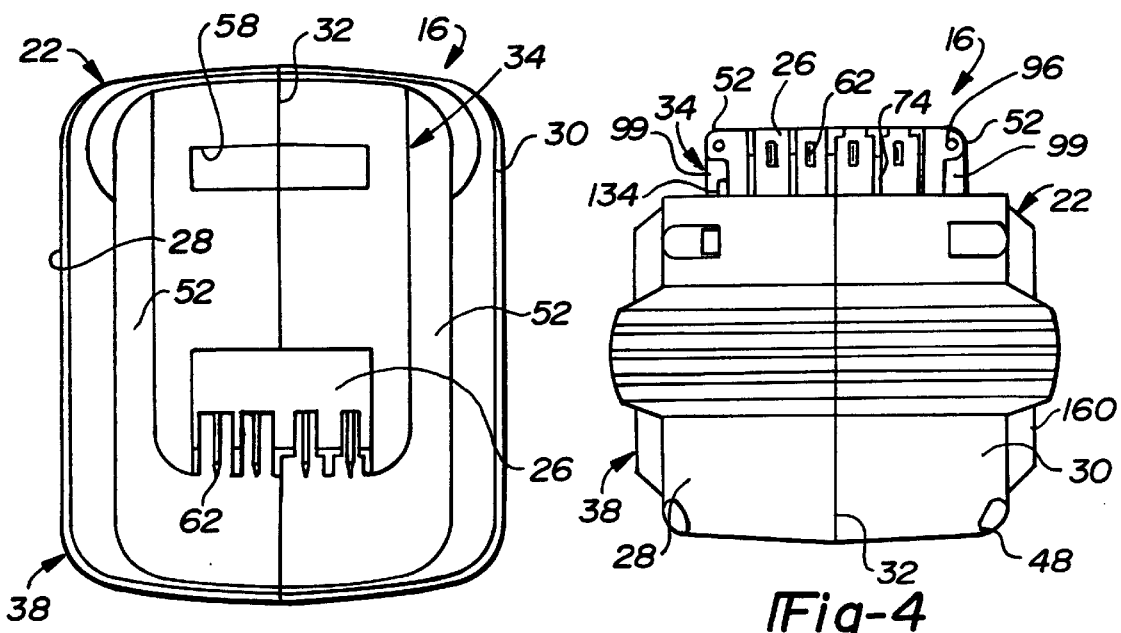
Fig-3
Fig-4
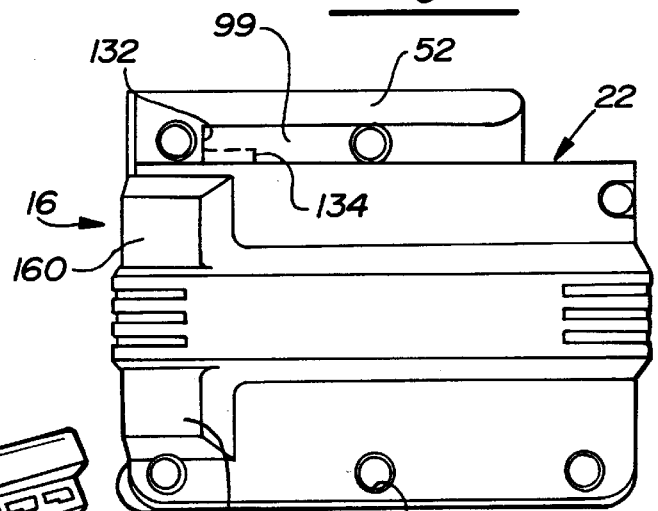
Fig-5
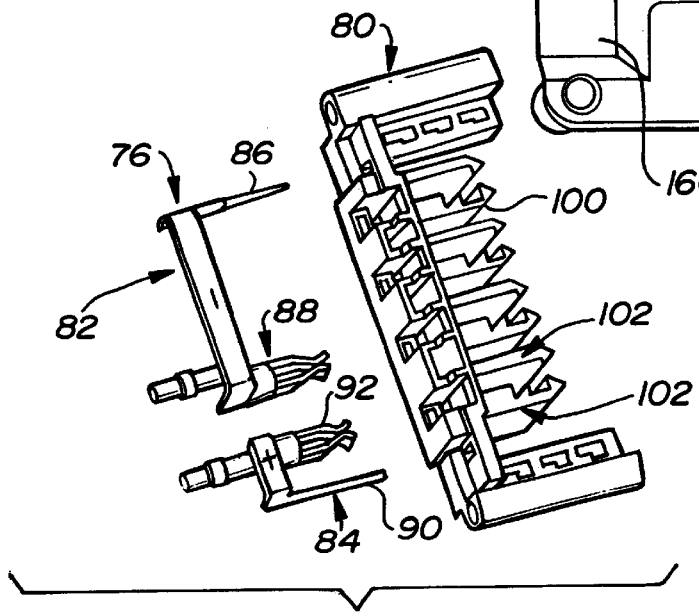
Fig-6A

CORDLESS POWER TOOL SYSTEM

This is a continuation of U.S. Ser. No. 09/133,923 filed Aug. 13, 1998, which is a continuation-in-part of U.S. Ser. No. 09/133,924, filed Aug. 13, 1998 and issued on May 2, 2000 as U.S. Pat. No. 6,057,608.

BACKGROUND AND SUMMARY OF THE INVENTION

The present invention generally pertains to power tools. More particular, the present invention pertains to a system of cordless power tools. More specifically, but without restriction to the particular embodiment and/or use which is shown and described for purposes of illustration, the present invention relates to a system of cordless power tools with an improved battery pack interface. The present invention also pertains to a related method.

Cordless power tools including interchangeable battery units are widely known in the prior art. For example, one such system is shown and described in commonly assigned U.S. Pat. No. 3,952,239. U.S. Pat. No. 3,952,239 discloses a system of tools utilizing individual tool heads, each of which incorporates its own essential elements such as a motor and a blade or chuck. This type of system reduces space requirements for tool storage and increases the life span for each motor. Another significant aspect of systems such as that disclosed by U.S. Pat. No. 3,952,239 is the fact that they permit improved utilization of incorporated nickel-cadmium batteries and an associated battery charger which are particularly high cost elements of the system.

While prior art systems, including but not limited to the type disclosed in U.S. Pat. No. 3,952,239, have proven to be suitable for many intended uses, they are all associated with certain disadvantages and/or limitations.

It is a general object of the present invention to provide an improved system of cordless power tools.

It is another object of the present invention to provide a battery pack for a cordless power tool with first and second housing halves and defining upper and lower chambers. A battery may be located in the lower chamber and a battery pack terminal block may be located in the upper chamber.

It is a related object of the present invention to provide a battery pack for a cordless power tool having longitudinally extending guide rails for engaging the tool and longitudinally extending terminal blades located between the rails. The front tips of the terminal blades and the guide rails have transversely aligned front tips.

It is another object of the present invention to provide a battery pack for a cordless power tool having a housing defining an upper chamber receiving a terminal block. The terminal block includes a plurality of pack terminals which are perpendicular to and spaced above a floor of the upper chamber thereby providing improved clearance around the terminals and also reducing the potential for contamination of the terminals with debris.

It is another object of the present invention to provide a method of releasably and electrically interconnecting a battery pack with a tool terminal block of a cordless power tool. The battery pack is first roughly centered along a longitudinal axis of the tool handle through engagement of guide rails with the cooperating rails carried by the tool. Then the battery pack is finely centered through engagement of battery pack terminals through engagement of the tool terminal block with the battery pack.

It is another object of the present invention to provide a battery pack for a cordless power tool which includes suitable protrusions to facilitate manual extraction.

It is another object of the present invention to provide a system of cordless power tools including a rechargeable battery pack, a non-isolated AC/DC converter having recessed terminals for interfacing with the tool and a non-isolated charger having recessed terminals for interfacing with the battery pack.

It is another object of the present invention to provide a system of cordless power tools including a charger having a housing with an open recessed deck for vertically receiving a rechargeable battery pack and a coupling portion for mechanically aligning the battery pack and the charger terminals and also connecting the battery pack mechanically in the charger such that longitudinal translation of the battery pack toward the coupling portion prevents vertical displacement of the battery pack relative to the housing.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is a top view of the battery pack of FIG. 2.

FIG. 4 is a front view of the battery pack of FIG. 2.

FIG. 5 is a right side view of the battery pack of FIG. 2.

FIG. 6A is an enlarged and exploded perspective view of a tool terminal block carried by the cordless power tool of FIGS. 1A–1C.

DETAILED DESCRIPTION OF THE PREFERRED EMBODIMENT

Figure 1A:
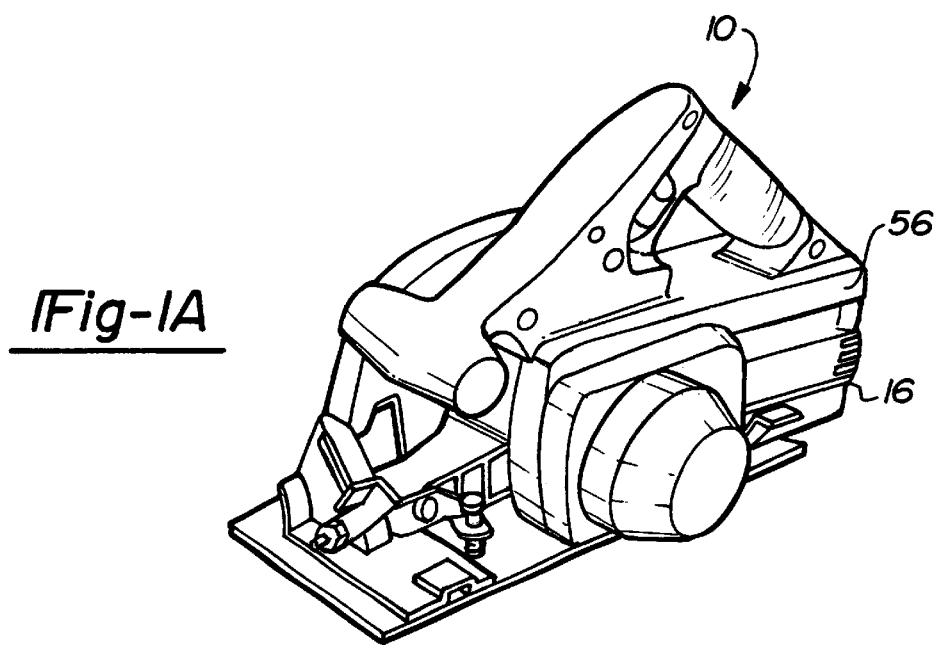
FIGS. 1A–1C are illustrations of a first cordless power tool of a cordless power tool system constructed in accordance with the teachings of a first preferred embodiment of the present invention.
Figure 1B:
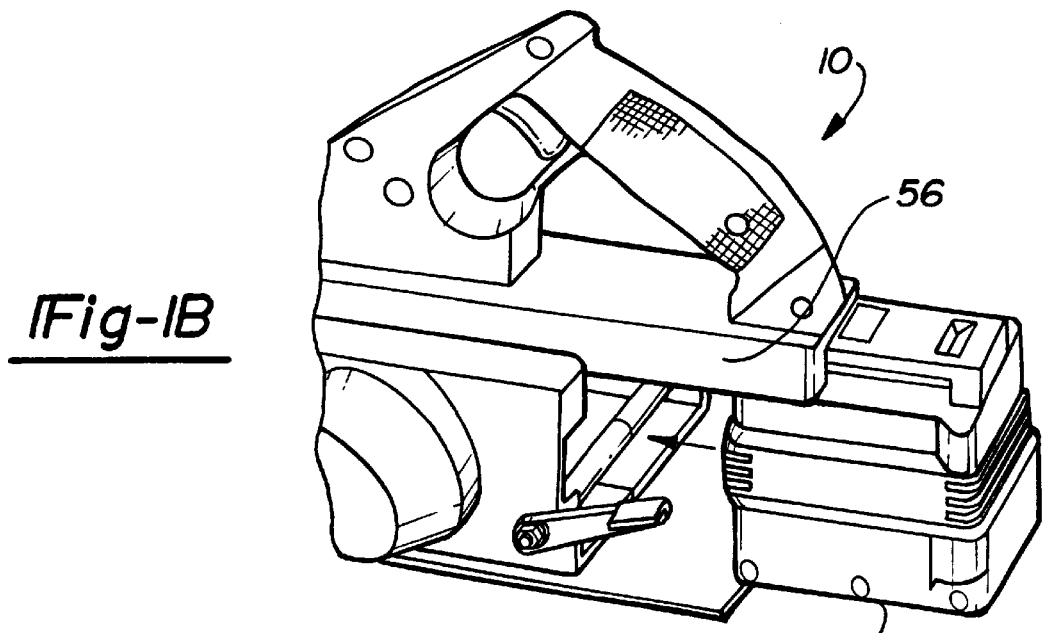
Figure 1C:
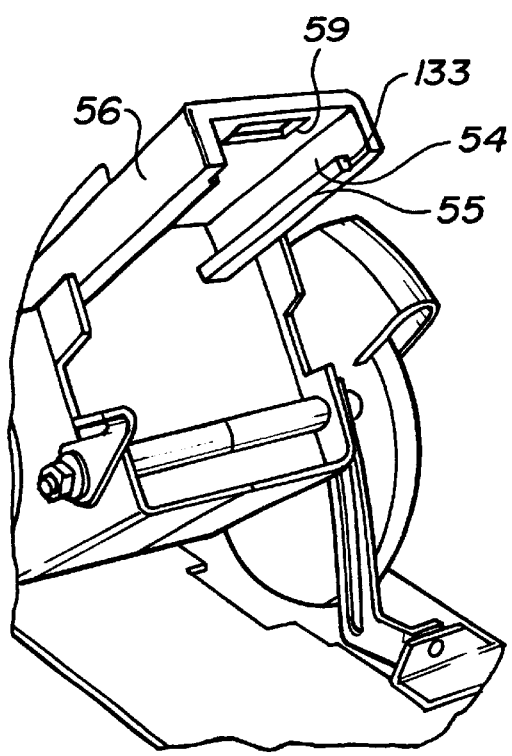
Figure 15:
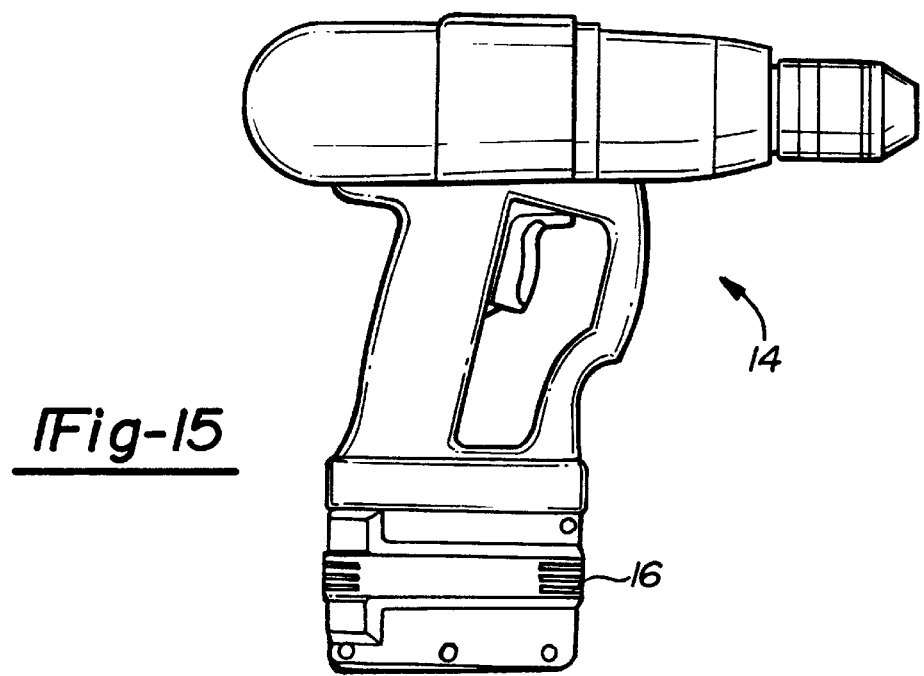
FIG. 15 is a side view of a third cordless power tool of the system of the present invention.

With general reference to the drawings, a system of cordless power tools constructed in accordance with the teachings of a preferred embodiment of the present invention is illustrated. Exemplary cordless power tools of the system are shown to include, by way of examples, a circular power saw 10 (FIG. 1), a reciprocating saw 12 (FIG. 13), and a drill 14 (FIG. 15). The tools 10–14 each include a conventional DC motor (not shown) adapted to be powered with a common voltage. In the exemplary embodiment, the tools 10–14 are intended to be driven by 24 volt electricity. It will become evident to those skilled that the present invention is not limited to the particular types of tools shown in the drawings nor to specific voltages. In this regard, the teachings of the present invention are applicable to virtually any type of power tool and any supply voltage.

Figure 11:
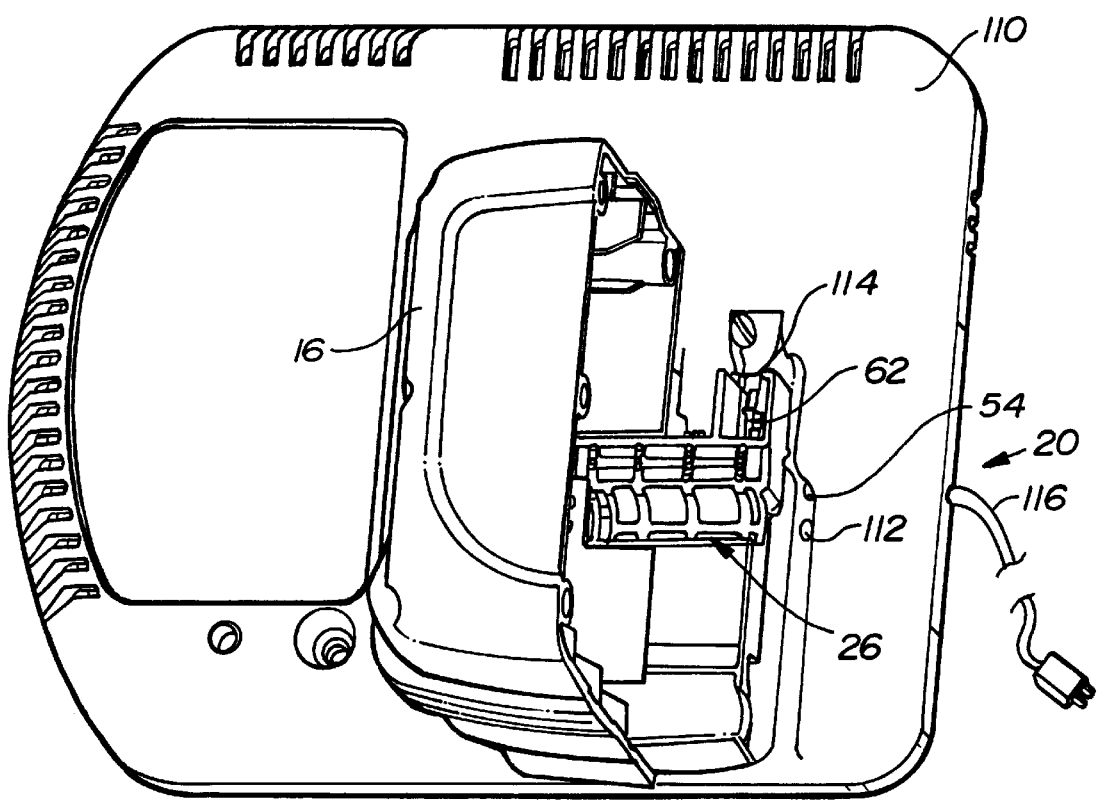
FIG. 11 is a partially exploded and partially cutaway view illustrating a battery pack charger of the system of the present invention shown operatively associated with the first battery pack.
Figure 13:
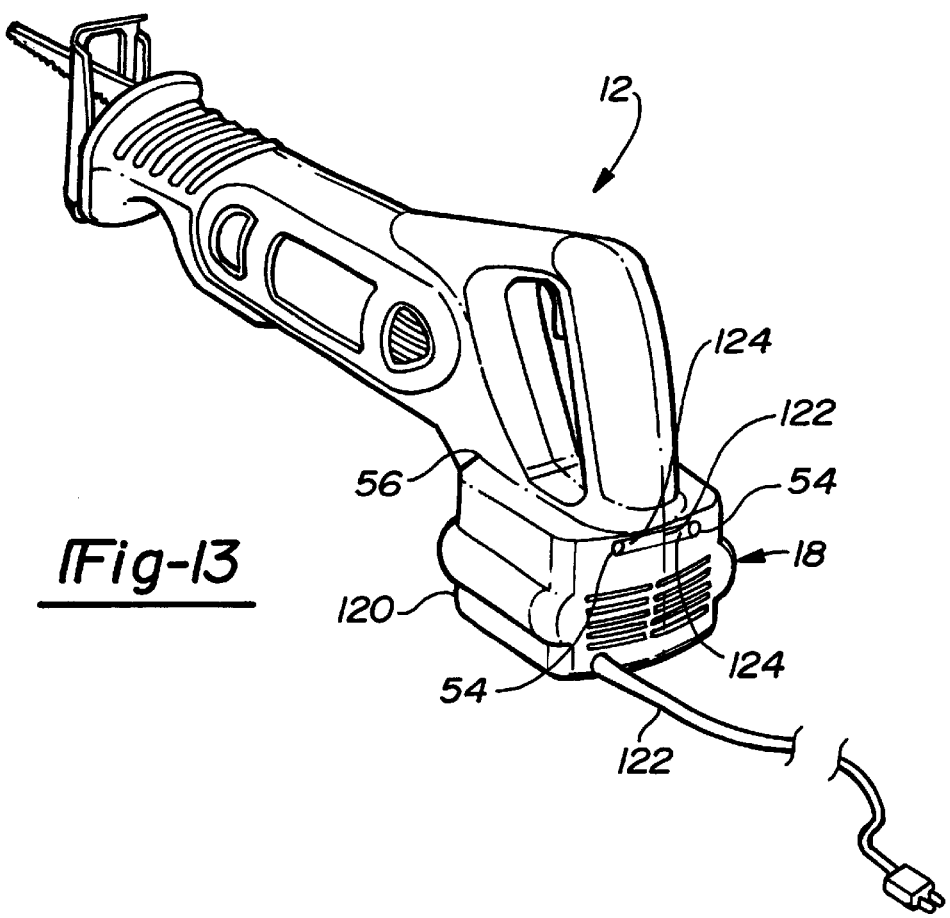
FIG. 13 is a perspective view of a second cordless power tool of the system of the present invention shown operatively associated with a converter.

With continued reference to the drawings, the system of the present invention is additionally shown to generally include a first rechargeable battery pack 16. The system of the present invention is further shown to generally include an AC/DC converter 18 and a battery charger 20 for charging the battery pack 16. The battery charger 20 is shown in FIG. 11 partially cut-away and operatively associated with the battery pack 16. The AC/DC converter is shown in FIG. 13 removably attached to the reciprocating saw 12.

The focus of the present invention most particularly pertains to the interfaces between the tools 10–14 and the battery pack 16, the interfaces between tools 10–14 and the AC/DC converter 18, and the interfaces between the battery pack 16 and the battery charger 20. During the remainder of this detailed description, it will be understood that the tool interface of each of the tools 10–14 is substantially identical.

With particular reference to FIGS. 2–6, the rechargeable battery pack 16 of the present invention is illustrated to generally include a housing 22, a battery 24 which in the exemplary embodiment illustrated is a 24 volt nickel-cadmium battery, and a battery pack terminal block 26. The housing 22 is shown to include first and second clam shell halves 28 and 30 which are joined at a longitudinally extending parting line 32. Alternatively, it will be understood that the housing 22 may include a pair of halves joined at a laterally extending parting line, or various other constructions including two or more housing portions.

The first and second clam shell halves 28 and 30 of the housing 22 cooperate to form an upper portion 34 defining a first chamber 36 and a lower portion 38 defining a second chamber 40. The first chamber 36 receives the battery pack terminal block 26, while the second chamber 40 receives the battery 24. The battery pack terminal block 26 is fixed against lateral and longitudinal movement relative to the housing 22 except for minimal part tolerance stack up. In one application, the battery pack housing 22 has an overall length of approximately 11.5 cm, an overall width of approximately 9.5 cm, and an overall height of approximately 9.5 cm.

In the exemplary embodiment, the first and second clam shell halves 28 and 30 of the housing 22 are each unitarily constructed from a rigid plastic or other suitable material. The first and second clam shell haves 28 and 30 are joined by thread-forming fasteners 42. The thread-forming fasteners 42 pass through cooperating apertures 44 and screw boss portions 46 integrally formed with the clam shell halves 28 and 30. Upon assembly, the fasteners 42 form threads in screw boss portions 46 of housing 30. In the exemplary embodiment illustrated, the first clam shell half 28 of the housing 22 is formed to include a peripheral groove 50 adapted to receive a mating rib (not specifically shown) peripherally extending about the second clam shell half 30.

To facilitate releasable attachment of the battery pack 16 to the tool 10, the upper portion 34 of the housing 22 is formed to include a pair of guide rails 52. The guide rails 52, which will be described further below, are slidably received into cooperating grooves 54 defined by rails 55 formed in a housing 56 of the tool 10. To further facilitate removable attachment of the battery pack 16 to the tool 10, the upper portion 34 of the housing 22 defines a recess 58. The recess 58 is adapted to receive one or more latch 59 carried by the housing 56 of the tool 10. The latch 59 is conventional in construction and operation and is spring biased to a downward position so as to engage the recess 58 upon insertion with the rechargeable battery pack 16. Removal of the battery pack 16 is thereby prevented until the spring bias of the latch 59 is overcome in a conventional manner insofar as the present invention is concerned.

Figure 7:
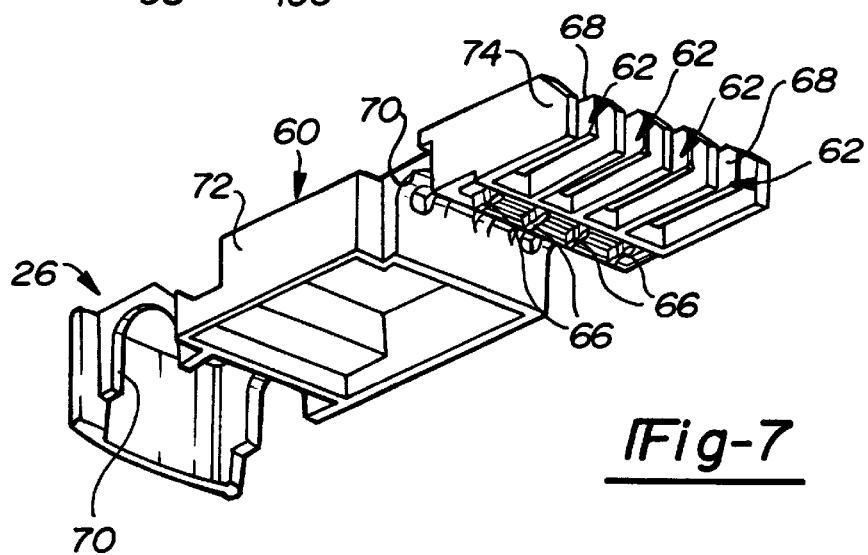
FIG. 7 is a perspective view of the battery pack terminal block of FIG. 2.
Figure 8:
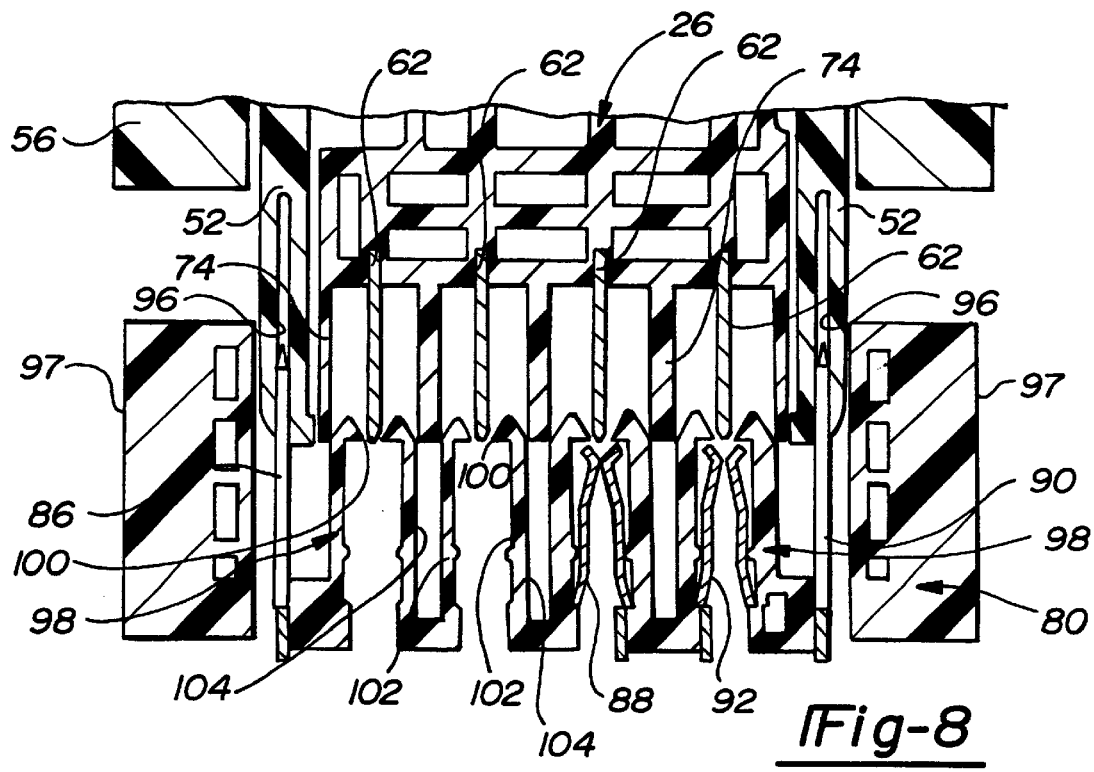
FIG. 8 is a cross-sectional view illustrating the interface between the battery pack and tool.

With continued reference to FIGS. 2–5 and additional reference to FIGS. 7 and 8, the battery pack terminal block 26 is illustrated to generally include a main body portion 60 constructed of rigid plastic or other suitable material and a plurality of terminals 62. The terminals 62 are generally planar-shaped blade terminals each oriented in a plane substantially perpendicular to a floor 64 (shown in FIG. 2) partially defining the upper chamber 36 of the housing 22. Each blade terminal 62 includes a first end 66 which downwardly extends from the main body portion 60. The blade terminals 62 each further include a second end 68 which forwardly extends. In the preferred embodiment, the second ends 68 of the blade terminals 62 are upwardly spaced from the floor 64. As will be appreciated more fully below, such spacing of the blade terminal 62 from the floor 64 provides improved clearance around the blade terminals 62 and reduces the risk of contamination of the terminals 62 with dirt and other debris. In addition, such spacing of the terminals 62 from the floor 64 allows the contacts of the charger 20 to be more fully enclosed by insulating material. This aspect of the present invention will be discussed more further below. Further in the preferred embodiment, the front tips of the blade terminals 62 and the guide rails 52 are transversely aligned.

The main body 60 of the terminal block 26 is shown captured between the clam shell halves 28 and 30 of the housing 22. This arrangement improves assembly by allowing the terminal block 26 to first be electrically attached to the battery 24 and subsequently captured between the clam shell halves 28 and 30. The main body 60 is shown to include a pair of arcuate grooves 70 provided in an under surface thereof for accommodating the screw boss portions 46 of the housing 20 upon assembly. Similarly, an upper side of the main body 60 includes a recess 72 for accommodating the recess 58 of the housing 22. The main body portion 60 is further shown to include a plurality of insulating portions 74 interdisposed between adjacent blade terminal 62 and also positioned outboard of each of the outermost end blade terminals 62. The insulating portions 74 protect the blade terminals 62 from incidental contact or damage.

In the exemplary embodiment illustrated, the battery pack terminal block 26 includes four blade terminals 62. Two of the blade terminals 62 are the positive and negative terminals for the battery 24. A third terminal 62 may be used to monitor temperature of the battery 24 and a fourth terminal may be used for battery identification. The particular functions of the third and fourth blade terminals 62 are beyond the scope of the present invention and need not be described in detail herein. It will be appreciated by those skilled in the art that additional terminals 62 may be employed within the scope of the present invention.

Figure 6B:
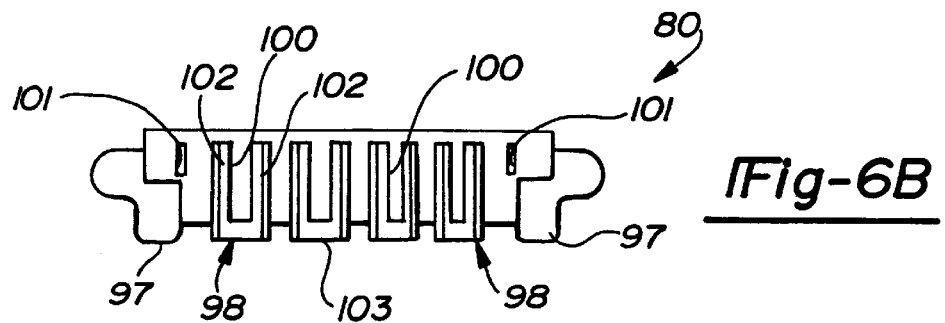
FIG. 6B is an end view of the main body portion of the tool terminal block.

With particular reference now to FIGS. 6A–B and 8, a terminal block 76 carried by the tool 10 will be described.

The tool terminal block 76 is attached to the housing 56 so as to prevent lateral movement relative to the housing except for part tolerance stack up. In the exemplary embodiment illustrated, the tool terminal block 76 is attached to the housing 56 so as to also prevent longitudinal movement. However, as discussed below, certain applications may desire limited longitudinal translation of the tool terminal block 76.

The tool terminal block 76 is illustrated to generally include a main body portion 80, a first or negative terminal member 82, and a second or positive terminal member 84. The first terminal member 82 includes a negative male terminal 86 and a negative female terminal 88. Similarly, the second terminal member includes a positive male terminal 90 and a positive female terminal 92. As will be further discussed below, the female terminals 88 and 92 are adapted to receive the positive and negative blade terminals 62 of the battery pack terminal block 26. The male terminals 86 and 90 are adapted to electrically attach the tool 10 to the converter 18. As shown in FIG. 8, when the battery pack 16 is operatively attached to the tool 10, the male terminals 86 and 90 of the tool terminal block 76 are received within clearances, shown in the exemplary embodiment as apertures 96, provided in each of the rails 52. Alternatively, the clearances 96 to accommodate the male terminals 86 and 90 may be in the form of grooves provided in the rails 52 or the rails may be cut back. It will be understood that the male terminals 86 and 90 serve no electrical function when the battery pack 16 is attached to the tool 10.

As shown particularly in the end view of FIG. 6B and the cross-sectional view of FIG. 8, the main body 80 of the tool terminal block 76 includes a plurality of window frames 98 which each define a window or opening 100 for receiving and guiding one of the blade terminals 62. The female terminals 88 and 92 of the tool terminal block 76 are disposed within adjacent ones of the window frames 98. The window frames 98 are generally U-shaped and each include a pair of longitudinally extending legs 102 connected by an intermediate segment 103. Openings 104 are provided between adjacent window frames 98 for receiving the insulating portions 74. In the exemplary embodiment, the ends of each of the legs 102 of the frames 98 are generally triangular in shape so as to define lead-in surfaces for the insulating portions 74 into the openings 104 and also for the terminal blades 62 into their respective opening 100.

As shown most clearly in FIG. 6B, the main body portion 80 of the tool terminal block 76 includes a pair of laterally spaced rails 97. The main body portion 80 further includes a pair of apertures 101 which receive the male terminals 86 and 90. The rails 97 are adapted to be received within grooves 99 provided in the housing 30 of the battery pack 16 immediately below the guide rails 52. As will be further discussed below, the laterally spaced rails 97 establish a tight fit with the grooves 99 for precisely aligning the tool terminal block 76 with the battery pack terminal block 26.

Figure 12:
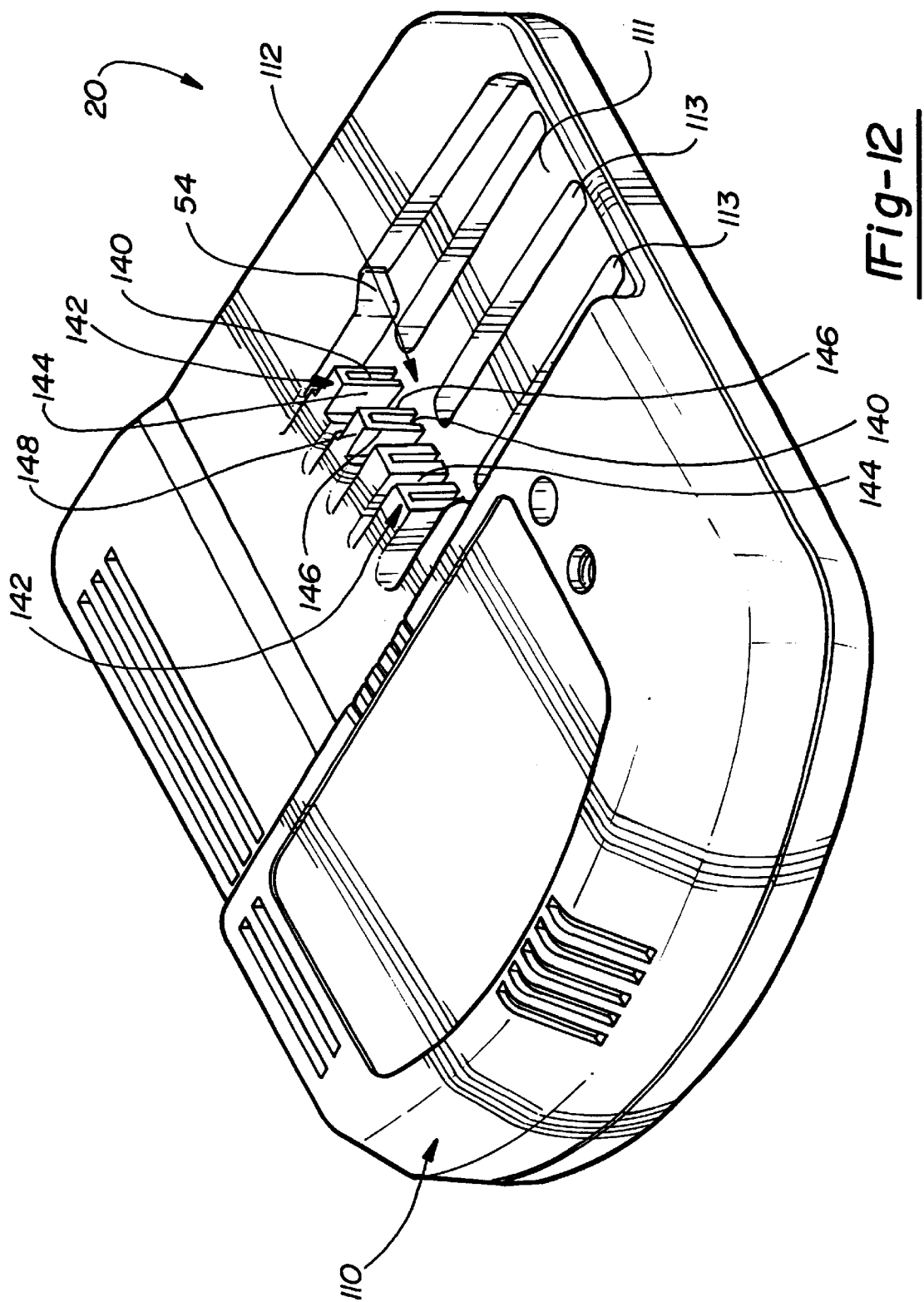
FIG. 12 is a perspective view of a battery pack charger of FIG. 11.

With specific reference to FIG. 11, a partially cutaway view of the battery charger 20 of the system of the present invention is shown operatively associated with a battery pack 16 partially removed for purposes of illustration. FIG. 12 is an elevated perspective view of the charger 20 shown with the battery pack 16 removed. In the preferred embodiment, the battery charger 20 is a non-isolated charger. As used herein, the term non-isolated will be understood to mean that the output voltage is not isolated from the main input voltage. The battery charger 20 includes a housing 110 including an open recessed deck 111. The battery charger housing 110 further includes a rear coupling section 112 for mechanically engaging the upper portion 34 of the battery pack housing.

The rear coupling section 112 includes a pair of opposed grooves 54 similar to that provided in the tool housing 56 which receive the guide rails 52 of the battery pack 22. The battery charger 20 further includes a set of female terminals having at least a pair of female terminals 114 for receiving the positive and negative blade terminals 62 of the battery terminal pack 26. An electrical cord 116 provides AC electricity (for example, 120 volt electricity) to the battery charger 20. Adjacent positioning of the positive and negative terminal blades 62 permits a circuit layout of the charger which reduces electromagnetic interference.

The battery charger housing 110 is shown most clearly in FIG. 12 to define a plurality of blade terminal openings 140 corresponding in number to the blade terminals 62 of the battery pack 16. The blade terminal openings 140 are defined by insulating portions 142 adapted to cooperatively receive the insulating portions 74 of the battery pack 16. In this regard, adjacent insulating portions 142 are spaced apart to define openings 144 for receiving the insulating portions 74. The insulating portions 142 of the charger housing 110 each include a pair of vertically oriented sidewalls 146 and a horizontally oriented upper segment 148. The upper segments 148 function to conceal the terminals 114 from incidental contact or damage. Since the blade terminals 62 of the battery pack 16 are vertically spaced from the floor 64, the upper segments 148 can be accommodated therebetween. It will be understood by those skilled in the art that the remainder of the battery charger 20 is conventional in construction insofar as the present invention is concerned.

The battery pack 16 is loaded into the charger 20 by first vertically positioning the pack 16 on the deck 111 and then sliding the pack 16 rearward to engage the rails 52 of the pack 16 with the grooves 54 of the charger 20. While on the deck 111, the pack 16 is supported by ribs 113. The open deck 111 facilitates location of the pack 16 in the charger 20 since the pack 16 is first grossly aligned with the charger 20 through placement on the deck 111 and then mechanically and electrically connected through a rearward sliding action. A mechanical interface of improved stability is provided. In the event a user lifts the pack 16 and charger 20 by gripping the pack 16 only, the engaged rails 52 and grooves 54 avoid potentially damaging loads on the electrical terminals. Thus, the combination of the loading deck 111 and the rear coupling section 112 provides improved loading ergonomics and mechanical stability of the connection.

Turning now to FIG. 13, the converter 18 of the system of the present invention is illustrated operatively attached to the reciprocating saw 12. Again, it will be appreciated by that the particular tool 12 shown in FIG. 12 is merely exemplary. In this regard, the converter 18 is operative for use with the circular saw 10 shown in FIG. 1, the drill 14 shown in FIG. 15, or any other tool similar constructed in accordance with the teachings of the present invention. The converter 18 of FIG. 13 is specifically adapted for converting main voltage AC electricity to 24 volt DC electricity.

In the preferred embodiment, the converter 18 is a non-isolated converter and includes a housing 120 and an electrical power cord 122. The housing 120 is substantially similar to the housing 22 of the battery pack 16. In this regard, the housing 120 includes first and second clam shell halves joined at a longitudinally extending parting line. Alternatively, the housing 120 may include three (3) or more pieces. An upper portion 122 of the housing 120 includes a pair of guide rails 124 similar to those of the battery pack 16.

Figure 14:
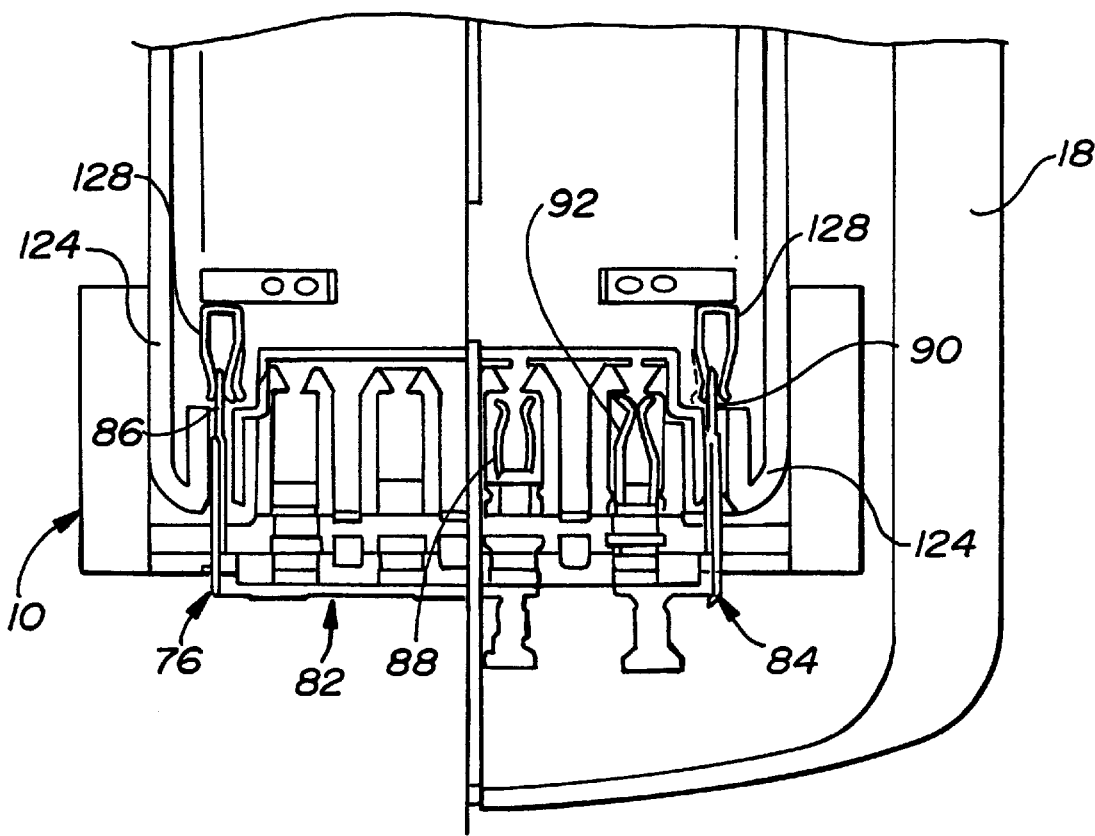
FIG. 14 is a cross-sectional view illustrating the interface between the cordless power tool and the converter.

With continued reference to FIG. 13 and additional reference to FIG. 14, the converter 18 is shown to include a pair of female terminals 128 adapted to receive the male terminals 86 and 90 of the tool terminal block 76. The female terminals 128 are recessed within the upper portion 122 of the housing 120 of the converter 18. In the preferred embodiment, the female terminals 128 are recessed within the housing 120 of the converter 18 approximately 8 mm or more. AC power is converted to DC power by the converter 18 and delivered to the tool 12 through the terminals 128. When the converter 18 is operatively installed on the tool 12, the female terminals 88 and 92 of the tool terminal block 76 are electrically inoperative.

Figure 16:
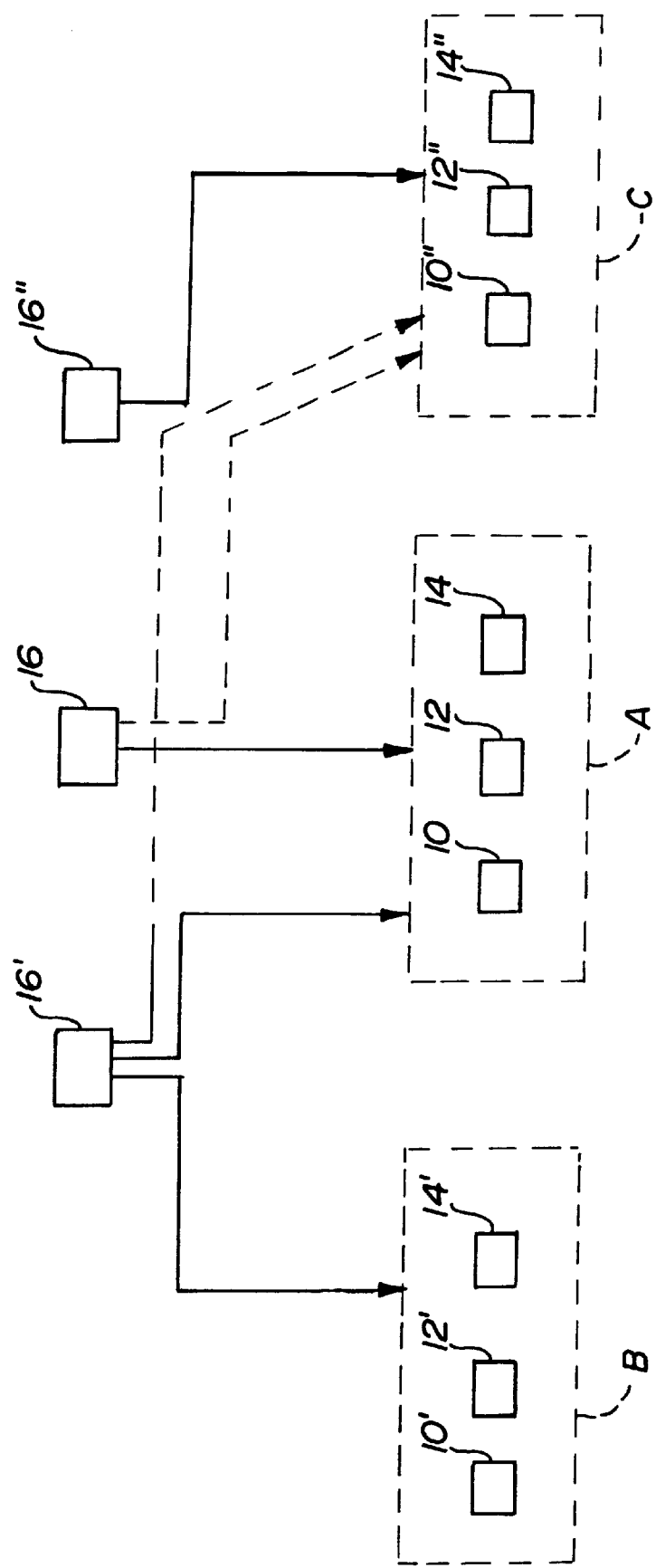
FIG. 16 is a schematic representation illustrating the compatibility of the various batteries and tools of the present invention.

As discussed above, the exemplary tools 10–14 shown throughout the drawings are specifically designed to operate on 24 volt DC electricity. With reference to the schematic illustration of FIG. 16, the system of the present invention is shown to further include second and third lines B and C of cordless power tools specifically intended for operation at alternate voltages. With the exception of their motors, the second and third lines B and C of power tools are substantially identical to the tools 10–14 of the first line A. For purposes of identification, the tools of the second and third lines B and C are denoted in the drawings with common reference numerals which are primed and double-primed, respectively. It will be understood that the tools 10'–14' and 10"–14" are powered by second and third voltages, respectively. In the exemplary embodiment, the second and third voltages are lower and higher than the first voltage, respectively. The multiple lines A–C of tools operatively driven by different voltage values provide a consumer with a wide range of selection to accommodate particular power requirements.

Figure 9:
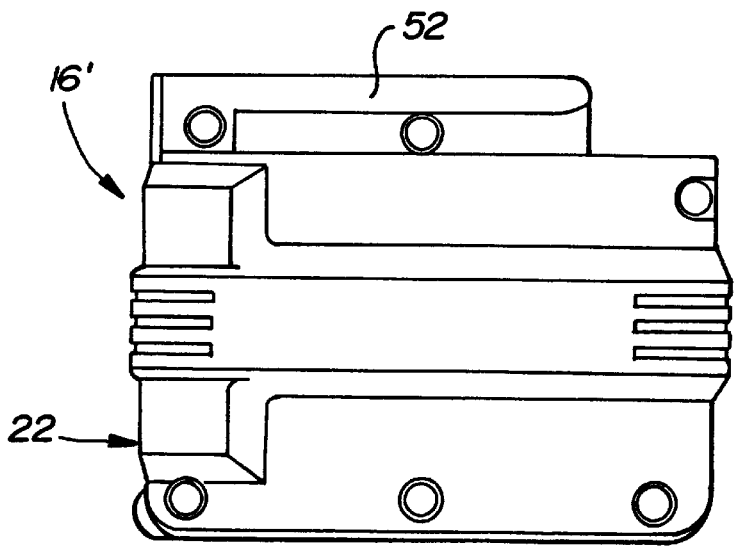
FIG. 9 is a right side view of a second battery pack for the cordless power tool system of the present invention.
Figure 10:
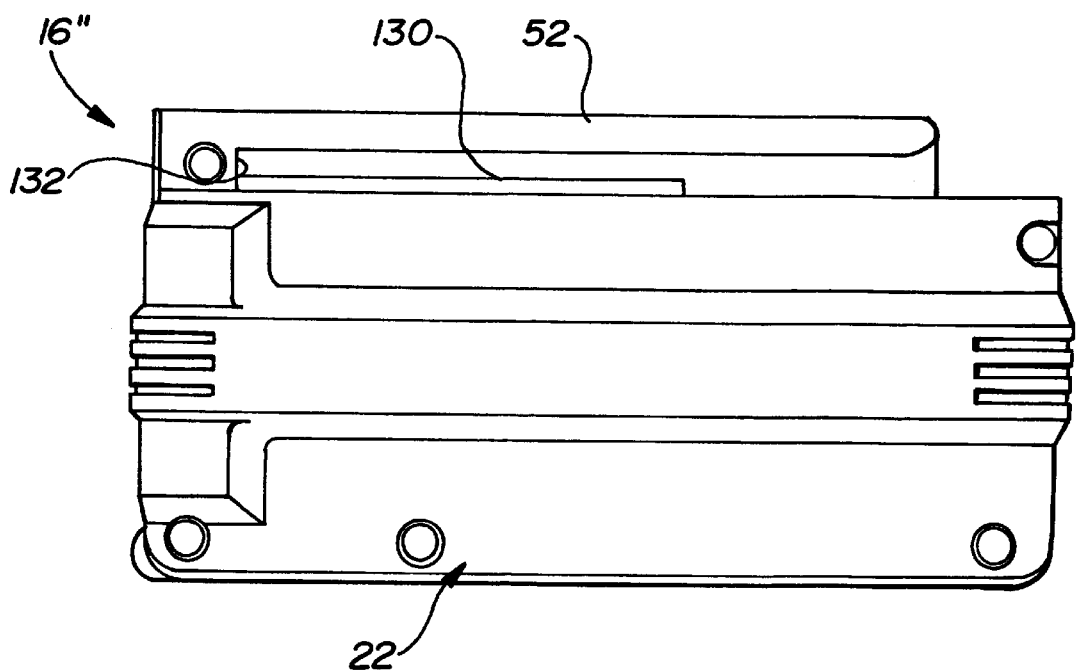
FIG. 10 is a right side view of a third battery pack of the cordless power tool system of the present invention.

As shown in FIGS. 9 and 10, the system of the present invention is illustrated to include second and third battery packs 16' and 16" for providing electricity at the second and third voltages, respectively. The second and third battery packs 16' and 16" are substantially identical in construction to the first battery pack 16. For this reason, reference numerals introduced above with respect to the first battery pack 16 will be used to identify common elements of the second and third battery packs 16' and 16".

The third battery pack 16" differs from the first battery pack 16 in that its housing 22 is substantially longer in a longitudinal direction so as to accommodate additional battery cells. In the exemplary embodiment, the width and height dimensions of the third battery pack 16" are identical to corresponding dimensions of the first battery pack 16. The rails 52 of the third battery pack 16" are correspondingly longer as are the grooves 54 formed in the housings 56 of the tools 10"–14" of the third line.

The system of the present invention is intended to prevent operative engagement of any battery pack (e.g., 16 or 16") with a lower voltage value tool so as to protect the electric motors from damage. For example, the higher voltage third battery pack 16" is intended to be locked out of both the tools 10–14 of the first line A and the tools 10'–14' of the second line B. In this regard, the housing 22 of the third battery pack 16" is shown to include a lock-out rib 130. In the embodiment illustrated, the rib 130 extends approximately 86 millimeters from a datum wall 132 and is approximately two millimeters in height and two millimeters in width. The datum wall 132 normally limits translation of the rails 52 relative to the grooves 54. An appropriate stop surface 133 will engage the rib 130 and prevent engagement of the third battery pack 16" which has a higher voltage with the terminal blocks 76 of the tools of the first and second lines A and B.

With particular reference to FIG. 5, the first battery pack 16 is designed to be locked out of the lower voltage tools 10'–14' of the second line B and will not be long enough to engage the terminal block of the third line C. The first battery pack 16 has a lockout rib 134 which extends approximately 14 millimeters from the datum wall 132. Again, the lockout rib 134 is approximately two millimeters in height and two millimeters in width. While not specifically shown, it will be understood that the grooves 54 of the tools 10–14 of the first line A are formed to accept the lockout rib 134 while the grooves of the tools of the lower voltage second line B are not.

With specific reference to FIG. 9 illustrating the second battery pack 16', it will be understood that the second battery pack 16' is not specifically intended to be mechanically locked out of any of the tools of any of the lines A–C. However, the length of the battery pack 16', which in the preferred embodiment is identical to that of the first battery pack 16, is insufficient to engage the tool terminal block of the third line C of tools. The battery pack 16' is adapted to work in both the first and second tools lines A and B. In the alternative arrangement discussed above in which the higher voltage third battery pack 16" has a length identical to that of the first and second battery packs 16 and 16', the low voltage second battery pack 16' would not need to be locked out of the tools of the higher voltage tool line C. However, sufficient power may not be available for intended usages. The dashed line between the battery packs 16 and 16' and the tools of the third line C shown in FIG. 16 indicates this alternative where electrical engagement is not prevented.

Attachment of the battery pack 16 to the housing 56 automatically aligns or centers the blade terminals 62 of the battery pack 16 with the female terminals 88 and 92 of the tool terminal block 76. When the battery pack 16 is inserted into the tool housing 56 the alignment of pack terminal blades 62 and the female tool terminals 88 and 92 occurs in two stages. In a first stage, the guide rails 52 are loosely engaged in the mating tool grooves 54. The total travel of the battery pack 16 relative to the housing 56 is approximately 60 mm. In the second stage, which occurs during approximately the last 22 mm of travel of the pack 16 relative to the housing 56, the grooves 99 in the housing 30 of the battery pack 16 engage the rails 97 of the tool terminal block 76 in a tight fit. In the preferred embodiment, the housing 30 and the alignment rails 97 are in a snug fit. This engagement precisely aligns the battery pack 16 with the tool terminal block 76 and in turn aligns the pack terminal block 26 with the tool terminal block 76. Normally, the blade terminals 62 of the pack 16 will engage the female tool terminals 88 and 92 without further alignment. If the terminal blades 62 are bent, then the terminal blade 62 may engage an associated window frame 98 of the tool terminal block 76. The tapered legs 102 of the frame 98 may aid in straightening a slightly bent terminal blade 62. If the terminal blade 62 is severely bent, entry of the terminal blade 62 into the opening 100 is prevented by the frame 98.

As noted above, it may be alternatively desirable to permit the tool terminal block 76 to longitudinally slide in the tool housing 56. When the pack terminal blades 62 are inserted in the female tool terminals 88 and 92 in such an arrangement, the pack terminal blades 62 engage the female tool terminals 88 and 92 and slightly translate the tool terminal block 76 rearwardly. For example, such translation may be on the order of approximately 2 mm. When the tool terminal block 76 reaches its limit of travel relative to the tool housing 56, the pack terminals blades 62 are inserted between the female tool terminals 88 and 92. Then, the pack blade terminals 62 are firmly gripped between the female tool terminals 88 and 92. If the battery pack 16 moves relative to the tool housing 56 due to vibration of the tool 10 along an axis parallel to the guide rails 52, the pack 16 and the tool terminal block 76 move together. This conjoint movement of the tool terminal block 76 and the pack 16 may reduce wear on the pack terminal blades 62 and female tool terminals 88 and 92.

Figure 2:
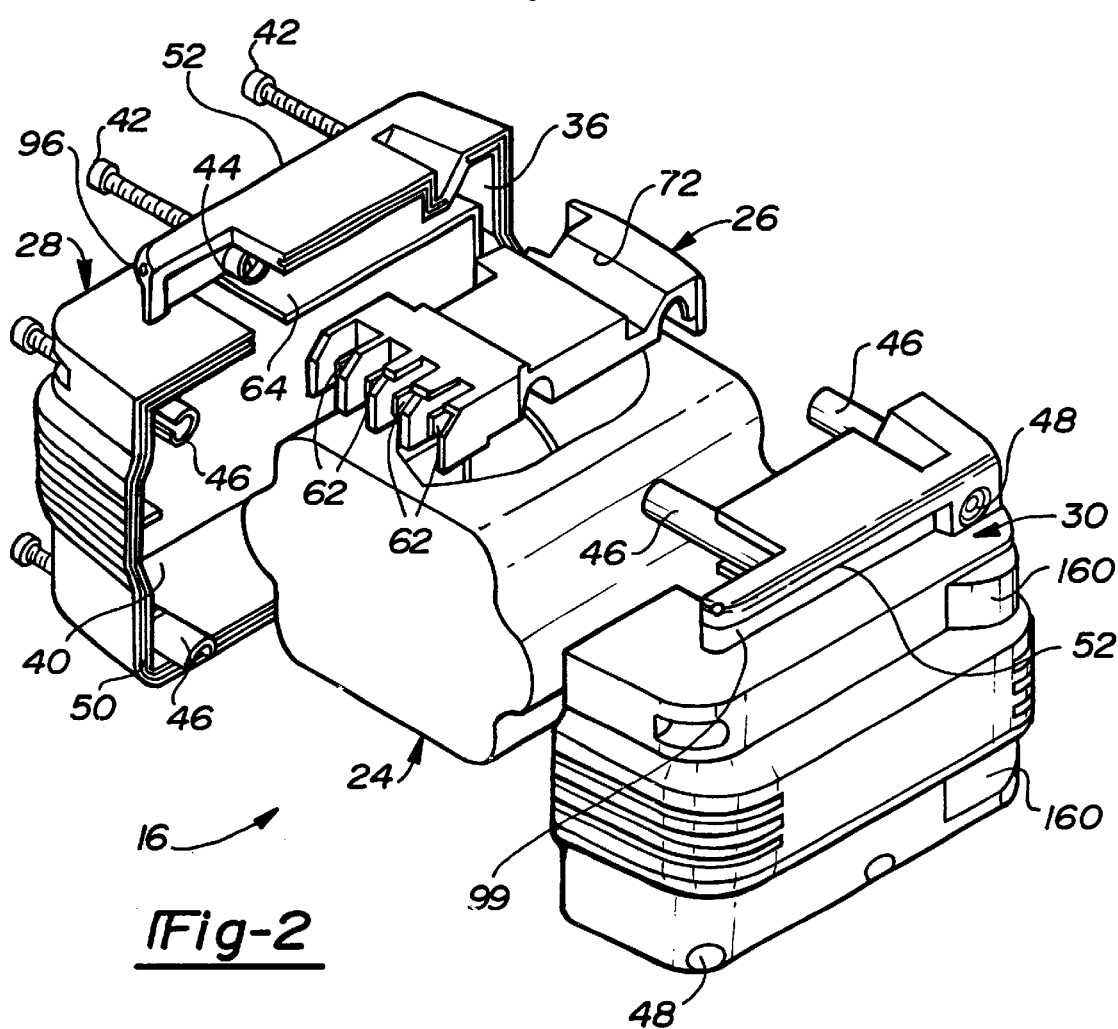
FIG. 2 is an enlarged and exploded perspective view of a first battery pack of the cordless power tool system which is shown in FIG. 1A.

With particular reference to FIG. 2, the battery pack 16 of the present invention is shown to include protrusions 160 to facilitate extraction of the battery pack 16 from the tool housing 56 or from the charger 20. In the exemplary embodiment, each of the housing halves 28 and 30 includes a pair of vertically spaced protrusions 160 disposed on a lateral side of the housing 22 adjacent a rear side of the housing 22. Each protrusion 160 is illustrated to be convexly curved and have a forward portion which the user may directly engage with a thumb or index finger. For example, the width of the battery pack 16 permits the user to engage an upper protrusion 160 of the second housing half 30 with the right thumb and an upper protrusion 160 of the first housing half 28 with the right index finger. The lower protrusions 160 may be used in a substantially similar manner when the battery pack 16 is inverted in the charger 20.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed:

1. A system of cordless power tools comprising:
    a rechargeable battery pack having a positive blade terminal and a negative blade terminal;
    an AC/DC converter having a housing and further having positive and negative female terminals, said positive and negative female terminals being recessed within said housing and being adapted to receive said positive and negative blade terminals, respectively; and
    a cordless power tool having a housing and positive and negative male terminals for engaging said positive and negative female terminals of said converter, respectively, said cordless power tool further having positive and negative female terminals adapted to receive said positive and negative blade terminals, respectively, said positive and negative female terminals of said tool being recessed within said housing of said tool.

2. The system of claim 1, wherein the cordless power tool is selected from a group of cordless power tools consisting of drill motors, reciprocating saws and circular saws.

3. The system of claim 1, wherein the battery pack includes a battery pack housing having a floor that is oriented substantially parallel to the blade terminals.

4. The system of claim 3, wherein the positive and negative blade terminals are spaced apart from the floor.

5. The system of claim 4, wherein the battery pack includes a battery pack terminal block having a main body portion that is fixedly coupled to the positive and negative blade terminals, the main body portion including an insulating member disposed between the positive and negative blade terminals, the insulating member extending outwardly from the main body portion beyond a distal end of each of the positive and negative blade terminals.

6. The system of claim 5, wherein the power tool includes a tool terminal block having a plurality of frame members that cooperate to define a plurality of windows, each of the positive and negative female terminals being coupled to the tool terminal block and disposed in an associated one of the windows, the frame members extending outwardly from the power tool beyond a distal end of each of the positive and negative female terminals, and wherein at least two of the frame members abut the insulating member when the battery pack is coupled to the power tool.

7. The system of claim 1, wherein the power tool includes a tool terminal block to which the positive and negative female terminals are coupled, the battery pack includes a battery pack terminal block to which the positive and negative blade terminals are coupled, and wherein one of the tool terminal block and the battery pack terminal block includes a pair of guide members and the other one of the tool terminal block and the batter pack terminal block includes a pair of complementary grooves that are configured to receive the guide members, the guide members and the grooves operatively aligning the tool terminal block to the battery pack terminal block.

8. A method of charging a battery pack for a cordless power tool, the battery pack including positive and negative blade terminals disposed between laterally spaced apart guide rails, said method comprising the steps of:
    providing a battery charger having a housing and positive and negative female terminals recessed within said housing, said housing further having an open deck and a coupling portion having a pair of laterally spaced grooves;
    vertically engaging said open deck with the battery pack;
    horizontally translating the battery pack toward said coupling portion;
    electrically coupling said positive and negative female terminals with said positive and negative male terminals, respectively; and
    mechanically coupling the battery pack and said charger by slidably engaging the guide rails with said grooves such that vertical displacement of the battery pack relative to said charger is prevented.

9. A system of cordless power tools comprising:
    a rechargeable battery pack including a pair of laterally spaced guide rails and battery pack terminal block disposed between said guide rails, said battery pack terminal block including a positive blade terminal and a negative blade terminal; and
    a battery charger including a housing and positive and negative female terminals for receiving said positive and negative blade terminals, respectively, said housing include an open deck portion for vertically receiving said battery pack and a coupling portion for mechanically engaging said battery pack, said coupling portion defining a pair of laterally spaced grooves for receiving said pair of laterally spaced guide rails such that longitudinal translation of said battery pack toward said coupling portion prevents vertical displacement of said battery pack relative to said housing.

10. The system of claim 9, wherein the battery pack includes a battery pack housing, the battery pack housing including a substantially horizontal surface that cooperates with the deck to grossly align the guide rails to the grooves.

11. The system of claim 10, wherein the battery pack housing includes a floor that is oriented generally perpendicular to the positive and negative blade terminals, the positive and negative blade terminals being located between the substantially horizontal surface and the floor.

12. The system of claim 9, further comprising a cordless power tool having a tool housing, a positive female tool terminal and a negative female tool terminal, the positive and negative female tool terminals being configured to receive the positive and negative blade terminals, respectively.

13. The system of claim 12, wherein the cordless power tool is selected from a group of cordless power tools consisting of drill motors, reciprocating saws and circular saws.

14. The system of claim 12, wherein the cordless power tool includes a tool coupling portion that defines a second pair of laterally spaced grooves for receiving the pair of laterally spaced guide rails such that longitudinal translation of the battery pack toward the tool coupling portion prevents vertical displacement of the battery pack relative to the tool housing.

15. The system of claim 14, further comprising an AC/DC converter having a converter terminal block, the converter terminal block including a positive converter terminal and a negative converter terminal that are adapted to engage the positive and negative female tool terminals.

16. The system of claim 15, wherein the converter includes a converter housing having a pair of laterally spaced converter guide rails that are disposed on a pair of opposite sides of the converter terminal block, the converter guide rails being configured to engage the second pair of laterally spaced grooves such that longitudinal translation of the converter toward the tool coupling portion prevents vertical displacement of the converter relative to the tool housing.

17. The system of claim 15, wherein the converter includes a converter housing into which the positive and negative converter terminals are recessed.

18. A system of cordless power tools comprising:
a rechargeable battery pack having a housing and a battery terminal block, the housing being formed by at least two housing shells, the battery terminal block being disposed between the housing shells and including a positive blade terminal and a negative blade terminal;
a battery charger having a charger housing, a positive charger terminal and a negative charger terminal, the positive and negative charger terminals being recessed within the charger housing and configured to engage the positive and negative blade terminals; and
a cordless power tool having a tool housing, a positive tool terminal and a negative tool terminal, the positive and negative tool terminals being recessed within the tool housing and configured to engage the positive and negative blade terminals.

19. The system of claim 18, wherein the cordless power tool is selected from a group of cordless power tools consisting of drill motors, reciprocating saws and circular saws.

20. The system of claim 18, wherein the battery pack housing includes a floor that is oriented substantially parallel to the blade terminals.

21. The system of claim 20, wherein the positive and negative blade terminals are spaced apart from the floor.

22. The system of claim 21, wherein the battery pack includes a battery pack terminal block having a main body portion that is fixedly coupled to the positive and negative blade terminals, the main body portion including an insulating member disposed between the positive and negative blade terminals, the insulating member extending outwardly from the main body portion beyond a distal end of each of the positive and negative blade terminals.

23. The system of claim 22, wherein the power tool includes a tool terminal block having a plurality of frame members that cooperate to define a plurality of windows, each of the positive and negative female terminals being coupled to the tool terminal block and disposed in an associated one of the windows, the frame members extending outwardly from the power tool beyond a distal end of each of the positive and negative female terminals, and wherein the at least two of the frame members abut the insulating member when the battery pack is coupled to the power tool.

24. The system of claim 18, further comprising an AC/DC converter, the converter including a housing, a positive converter terminal and a negative converter terminal, the positive and negative converter terminals being configured to engage the positive and negative tool terminals, respectively.

25. The system of claim 18, wherein the converter includes a converter housing having a floor that is oriented substantially parallel to the converter terminals.

26. The system of claim 25, wherein the positive and negative converter terminals are spaced apart from the floor of the converter housing.

27. The system of claim 26, wherein the converter includes a converter terminal block having a main body portion that is fixedly coupled to the positive and negative converter terminals, the main body portion including an insulating member disposed between the positive and negative converter terminals, the insulating member extending outwardly from the main body portion beyond a distal end of each of the positive and negative converter terminals.

28. The system of claim 27, wherein the power tool includes a tool terminal block having a plurality of frame members that cooperate to define a plurality of windows, each of the positive and negative tool terminals being coupled to the tool terminal block and disposed in an associated one of the windows, the frame members extending outwardly from the power tool beyond a distal end of each of the positive and negative tool terminals, and wherein the at least two of the frame members abut the insulating member when the converter is coupled to the power tool.

29. The system of claim 18, wherein one of the converter and the power tool includes a pair of rails and the other one of the converter and the power tool includes a pair of complementary grooves that are configured to receive the rails, wherein the rails are engaged to the grooves when the positive and negative converter terminals are engaged to the positive and negative tool terminals, respectively, and wherein engagement of the rails and grooves operatively secures the converter to the power tool such that the converter cannot be withdrawn from the power tool in a direction that is normal to the grooves.

30. The system of claim 18, wherein one of the battery pack and the charger includes a pair of rails and the other one of the battery pack and the charger includes a pair of complementary grooves that are configured to receive the rails, wherein the rails are engaged to the grooves when the positive and negative blade terminals are engaged to the positive and negative charger terminals, respectively, and wherein engagement of the rails and grooves operatively secures the battery pack to the charger such that the battery pack cannot be withdrawn from the charger in a direction that is normal to the grooves.

31. The system of claim 18, wherein one of the battery pack and the power tool includes a pair of rails and the other one of the battery pack and the power tool includes a pair of complementary grooves that are configured to receive the rails, wherein the rails are engaged to the grooves when the positive and negative blade terminals are engaged to the positive and negative charger terminals, respectively, and wherein engagement of the rails and grooves operatively secures the battery pack to the power tool such that the battery pack cannot be withdrawn from the power tool in a direction that is normal to the rails.

* * * * *